(12) United States Patent
Shim et al.

(10) Patent No.: US 11,182,338 B1
(45) Date of Patent: Nov. 23, 2021

(54) SYSTEM AND METHOD FOR SECURELY MANAGING DYNAMIC AND INTERACTIVE CASE FILE DOCUMENTS IN CHRONOLOGICAL ORDER

(71) Applicant: Entangle Media, LLC, Oldsmar, FL (US)

(72) Inventors: John H. Shim, Oldsmar, FL (US); Mark H. Pinson, Oldsmar, FL (US); Kyrylo Zinovyev, Oldsmar, FL (US)

(73) Assignee: Entangle Media, LLC, Oldsmar, FL (US)

( * ) Notice: Subject to any disclaimer, the term of this patent is extended or adjusted under 35 U.S.C. 154(b) by 0 days.

(21) Appl. No.: 17/305,846

(22) Filed: Jul. 15, 2021

(51) Int. Cl.
*G06F 16/11* (2019.01)
*G06F 7/24* (2006.01)
*G06F 16/93* (2019.01)
*G06Q 10/10* (2012.01)

(52) U.S. Cl.
CPC ............... *G06F 16/11* (2019.01); *G06F 7/24* (2013.01); *G06F 16/94* (2019.01); *G06Q 10/10* (2013.01)

(58) Field of Classification Search
CPC .............................. G06F 16/11; G06F 16/94
See application file for complete search history.

(56) References Cited

U.S. PATENT DOCUMENTS

| 2003/0133368 A1* | 7/2003 | Gotoh ................... H04N 1/215 |
| | | 369/13.56 |
| 2019/0226004 A1* | 7/2019 | Loftus .................... C12Q 1/025 |
| 2019/0266397 A1* | 8/2019 | Arakawa ............ H04N 1/00413 |

* cited by examiner

*Primary Examiner* — Baoquoc N To
(74) *Attorney, Agent, or Firm* — Smith & Hopen, P.A.; Paul Murty

(57) ABSTRACT

A case management system and method of managing and organizing documents within the case portfolio for efficient review includes data that is dynamically updated to result in a final report that includes real-time updated data. The system collects and displays the data on a secure portal for interactivity with a professional stakeholder reviewing the data. The data is automatically transformed into different formats when received, including a standard text-and-image file, a text-only file, and an image-only file, thereby allowing the reviewing stakeholder to interact with the data in multiple ways. As the system translates the document into different viewable formats, the system automatically scans the data within the document for important information, such as dates, times, names, locations, and other important pieces of information. The system then assigns date-and-time associations with each document, and automatically organizes the documents in a chronological order on a display.

20 Claims, 11 Drawing Sheets

Demo Case Lawyer Record Review (Layer 2) · DOL: 01/01/2019 · DOB: 07/01/1976
Worlds Best Hospital.pdf · Page 1                                           20a

[ PDF ]  [ IMAGE ]  [ TEXT ]                              [ PREV ] [ NEXT ]

≡ downloadPDF     1/1 | - 100% + | 🗎 ⟲                 Stapled pages are skipped
                                                         Tags
                                                         [ No tag ] [ Legal ] [ Bills ] [ NonSpecialty ]
           Worlds Best Hospital
           Date: January 1, 2019                         Dates
           Patient: Chronology, Medical                  07/04/1976    01/01/2019
           DOB: July 4, 1976                             Chronology Date    Chronology Time
           ER Physician: Joseph Emergency, MD            01/01/2019         __:__ m
           CC: Neck pain. Lower back pain.
           History: 42-year-old male, who was the restrained driver of a car, impacted in
           the rear. Minimal damage. Complaints of significant neck and back pain.    Author
           Brought in by EMS for evaluation. No loss of consciousness. Some complaints of    Joseph Emergency, MD
           tingling to the right leg. Headache. No bleeding. Vitals include a heart rate of  Visit type
           90, low pressure of 125/80, and respiratory rate of 12. Temperature of 99.2.      Emergency Room
           Pain level is 6/10 to the neck and back.                                    Notes
           Past medical history includes diabetes and hypertension. Family physician is Dr.  Worlds Best Hospital: 42-year-old male, restrained driver, impacted in
           Guy Medic. Takes metaformin and Lotensin. No past surgical history. States he    the rear. Neck and back pain. Brought in by EMS. Pain level 6/10.
           has some intermittent back pain in the past. No recent neck or back pain         Mild cervical and lumbar spondylosis.
    1      complaints.
           Physical exam showed a normal range of motion to the neck and back. There is     01/01/2019 ✎    01/01/2019 ✎              SAVE
           tenderness diffusely to the neck and lower back. No neurological deficits        Colors                                     — 24
           identified.                                                                  ○○○○○○○○
           X-ray cervical and lumbar spine showed mild cervical spondylosis at C5-C6 and ◉◎◍◉◍◍◉◉
           disc space narrowing at L5-S1.                                               ☐ include into workspace
           Discharge diagnosis: Cervical and lumbar sprain. Prescribed Motrin and Flexeril. ☐ include image into report
           Advised follow-up with his family physician.

[ GO TO ]  [ CLOSE ]
                                    [ Misc. ]  [ Work ] 1

Fig. 2A

Worlds Best Hospital.pdf - Page 1                                                                                    20b

| PDF | IMAGE | TEXT |

1  Worlds Best Hospital
   Date: January 1, 2019
   Patient: Chronology, Medical
   DOB: July 4, 1976

ER Physician: Joseph Emergency, MD
   CC: Neck pain. Lower back pain.
22 History: 42-year-old male, who was the restrained driver of a car, impacted in
   the rear. Minimal damage. Complaints of significant neck and back pain.
   Brought in by EMS for evaluation. No loss of consciousness. Some complaints of
   tingling to the right leg. Headache. No bleeding. Vitals include a heart rate of
   90, low pressure of 125/80, and respiratory rate of 12. Temperature of 99.2.
   Pain level is 6/10 to the neck and back.

Past medical history includes diabetes and hypertension. Family physician is Dr.
   Guy Medic. Takes metaformin and Lotensin. No past surgical history. States he
   has some intermittent back pain in the past. No recent neck or back pain
   complaints.
   Physical exam showed a normal range of motion to the neck and back. There is
   tenderness diffusely to the neck and lower back. No neurological deficits
   identified.

X-ray cervical and lumbar spine showed mild cervical spondyliosis at C5-C6 and
   disc space narrowing at L5-S1.
   Discharge diagnosis: Cervical and lumbar sprain. Prescribed Motrin and Flexeril.
   Advised follow-up with his family physician.

Chronology Date
01/01/2019

Author
Radiologist

Visit type
X-Ray

Notes
Worlds Best Hospital: 42-year-old male, restrained driver, impacted in
the rear. Neck and back pain. Brought in by EMS. Pain level 6/10.
Mild cervical and lumbar spondyliosis.                                    24

Visit
01/01/2019        01/01/2019

Color
○
☐ Include into workspace
☐ Include image into report

Fig. 2B

Demo Case Lawyer Record Review (Layer 2) · DOI: 01/01/2019 · DOB: 07/01/1976
Worlds Best Hospital.pdf · Page 1

20c

| PDF | IMAGE | TEXT |

| PREV | NEXT | | GO TO | 1 | CLOSE |

Stapled pages are skipped
Tags

| No tag | Legal | Bills | NonSpeciality | Misc | Work |

Dates

| 07/04/1976 | 01/01/2019 |

Chronology Date   Chronology Time

| 01/01/2019 | | __:__ m |

Author

| Joseph Emergency, MD |

Visit type

| Emergency Room |

Notes

Worlds Best Hospital: 42-year-old male, restrained driver, impacted in the rear. Neck and back pain. Brought in by EMS. Pain level 6/10. Mild cervical and lumbar spondylosis.

| 01/01/2019 📅 |   | 01/01/2019 📅 |

SAVE

Colors
○○○○○◐●●●●●●
◯ Include into workspace
◯ Include image into report

24

Worlds Best Hospital
Date: January 1, 2019
Patient: Chronology, Medical
DOB: July 4, 1976

ER Physician: Joseph Emergency, MD
CC: Neck pain, Lower back pain.
History: 42-year-old male, who was the restrained driver of a car, impacted in the rear. Minimal damage. Complaints of significant neck and back pain. Brought in by EMS for evaluation. No loss of consciousness. Some complaints of tingling to the right leg. Headache. No bleeding. Vitals include a heart rate of 90, low pressure of 125/80, and respiratory rate of 12. Temperature of 99.2. Pain level is 6/10 to the neck and back.

Past medical history includes diabetes and hypertension. Family physician is Dr. Guy Medic. Takes metaformin and Lotensin. No past surgical history. States he has some intermittent back pain in the past. No recent neck or back pain complaints.
Physical exam showed a normal range of motion to the neck and back. There is tenderness diffusely to the neck and lower back. No neurological deficits identified.

X-ray cervical and lumbar spine showed mild cervical spondylosis at C5-C6 and disc space narrowing at L5-S1.
Discharge diagnosis: Cervical and lumbar sprain. Prescribed Motrin and Flexeril. Advised follow-up with his family physician.

| | |
|---|---|
| 2020-06-20 | Medic Family Care .pdf (2 pages) |
| 2020-06-20 | Worlds Best Hositsal.pdf (1 pages) |
| 2020-06-20 | Twist DC billing.pdf (1 pages) |
| 2020-06-20 | Dr. Feelgood Need RFA in future.pdf (1 pages) |
| 2020-06-20 | Social Media Postings.pdf (1 pages) |
| 2020-06-20 | Crunch Chiropractic 12_6_18.ped (2 pages) |

MEDICAL CHRONOLOGY

April 18, 2018  Medical: Guy Medic, MD.
MVA years ago with back pain. Hypertension June 01, 2018  Chiropractic/Massage: Melanie Crunch, DC.
Back and neck pain since 2007. Neck and back pain 6/10.

June 04, 2018  Chiropractic/Massage: Melanie Crunch, DC.
Neck and back pain, 6/10.

June 06, 2018  Chiropractic/Massage: Melanie Crunch, DC.
Neck and back pain, 5/10.

June 11, 2018  Chiropractic/Massage: Melanie Crunch, DC.
Neck and back pain, 4/10.

June 25, 2018  Chiropractic/Massage: Melanie Crunch, DC.
Neck and back pain, 2/10.

Fig. 9

SYSTEM AND METHOD FOR SECURELY MANAGING DYNAMIC AND INTERACTIVE CASE FILE DOCUMENTS IN CHRONOLOGICAL ORDER

BACKGROUND OF THE INVENTION

1. Field of the Invention

This invention relates, generally, to case management systems. More specifically, it relates to a system and method of securely managing case file documents in chronological order, with centralized, secure access to the case and automated document organization based on detected dates from each document.

2. Brief Description of the Prior Art

Traditional case files, particularly in the medical and legal professions, include extensive amounts of documents including both important and unimportant data. For example, in a litigation matter, thousands of documents may be produced in response to various discovery requests. Each of those documents must be reviewed and categorized, but most of the documents ultimately contain unimportant information. However, a professional traditionally must manually review each document to determine the importance of the document, and must organize the documents into an order that is easily and quickly reviewable during an activity such as a deposition or a hearing. Typically, the result of the review and organization is an assortment of paper documents that are not easily searchable, which can result in incomplete information being given during a questioning activity.

Attempts have been made to provide electronic means of managing a case file including a plurality of documents. As data transfer and storage platforms become more technologically advanced, electronic databases have become a standard for sharing, reviewing, and organizing documents into a manageable case load. Utilizing such platforms, professionals can review key pieces of information much quicker than by manually searching through paper documents, as in the previous standard. However, these database platforms still require a great deal of manual input from the professional by reviewing each document, annotating the document as necessary, and organizing each document in a format that is easily reviewable when recollection of a document is required.

In particular, many cases, whether legal, medical, financial, or a similar field, depend on a chronological timeline of events based on dated documents. Timelines of documents can be manually created through both paper and electronic formats. However, the process of creating such timelines is time consuming and requires a great deal of effort on the part of the professional. In addition, case files in the legal, medical, and financial fields typically require a great deal of security to ensure that third-parties cannot gain access to the documents, particularly during the transfer of documents to a centralized case management system.

While different attempts have been made to provide case management systems including document organization, the prior art fails to provide a full-scale system and method of providing a secure platform that maintains documents in an organized format that is easily reviewable in a manageable way. Accordingly, what is needed is a robust system and method of securely managing case file documents in chronological order with minimal input required by a system user. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in several technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a case management system and method of managing and organizing documents within the case portfolio is now met by a new, useful, and nonobvious invention.

The novel method includes the step of receiving, via a server in communication with a database, an initial plurality of files. Each of the initial plurality of files includes an amount of data thereon, such that each of the initial plurality of files is stored on the database in communication with the server. The server automatically transforms each of the initial plurality of files into a machine-readable text format and a separate image-based format by scanning each file for recognizable text and displaying the recognizable text. After transforming each of the initial plurality of files into the machine-readable text format, the server automatically displays a suggested date associated with each of the initial plurality of files based on the recognizable text. The method includes the step of receiving, via the image-based format, for at least one of the initial plurality of files, a confirmation to associate the suggested date with a selected at least one of the initial plurality of files. The server organizes the initial plurality of files in a chronological order based on the suggested date. The server then displays the initial plurality of files in the chronological order, such that the server provides a link between the displayed initial plurality of files in the chronological order and each document of the initial plurality of files. As such, the server is configured to receive an instruction, via the displayed initial plurality of files in the chronological order, to display at least one of the initial plurality of files.

In an embodiment, the method includes the step of receiving, for at least one of the initial plurality of files, an identification tag based on a category of the least one of the initial plurality of files. The server organizes the initial plurality of files by the identification tag.

In an embodiment, the method includes the step of receiving, via the server, a second plurality of files. Each of the second plurality of files includes an amount of data thereon, such that each of the second plurality of files is stored on the database in communication with the server. The server automatically transforms each of the second plurality of files into a machine-readable text format and a separate image-based format by scanning each file for recognizable text and displaying the recognizable text. The server automatically displays a suggested date associated with each of the second plurality of files. The method includes the steps of automatically integrating each of the second plurality of files with each of the initial plurality of files, and organizing, via the server, the second plurality of files in the chronological order based on the suggested date.

In an embodiment, the method includes the step of displaying, via the server, the initial plurality of files in the chronological order on a timeline display including a start date and an end date arranged along an axis, such that each date between the start date and the end date is viewable in the timeline display. In such an embodiment, the method includes the step of receiving an instruction to display at least one of the initial plurality of files via a selection on the timeline display.

In an embodiment, the method includes the step of displaying, via the server, the initial plurality of files in the chronological order on a calendar display, wherein the initial plurality of files are displayed on days and months displayed on the calendar display. In such an embodiment, the method includes the step of receiving an instruction to display at least one of the initial plurality of files via a selection on the calendar display.

In an embodiment, the method includes the step of generating, via the server, a final report including a selected group of the initial plurality of files. The final report includes an executable file link for each of the selected group of the initial plurality of files. The method includes the step of receiving an instruction to display at least one of the selected group of the initial plurality of files via a selection of the executable file link for the at least one of the selected group of the initial plurality of files.

The novel case management system includes a processor and a non-transitory computer-readable medium operably coupled to the processor. The computer-readable medium has computer-readable instructions stored thereon that, when executed by the processor, cause a case management system to manage and organize files within a case portfolio by executing instructions. The instructions include receiving, via a server in communication with a database, an initial plurality of files. Each of the initial plurality of files includes an amount of data thereon, such that each of the initial plurality of files is stored on the database in communication with the server. The server automatically transforms each of the initial plurality of files into a machine-readable text format and a separate image-based format by scanning each file for recognizable text and displaying the recognizable text. After transforming each of the initial plurality of files into the machine-readable text format, the server automatically displays a suggested date associated with each of the initial plurality of files based on the recognizable text. The instructions include receiving, via the image-based format, for at least one of the initial plurality of files, a confirmation to associate the suggested date with a selected at least one of the initial plurality of files. The server organizes the initial plurality of files in a chronological order based on the suggested date. The server then displays the initial plurality of files in the chronological order, such that the server provides a link between the displayed initial plurality of files in the chronological order and each document of the initial plurality of files. As such, the server is configured to receive an instruction, via the displayed initial plurality of files in the chronological order, to display at least one of the initial plurality of files.

An object of the invention is to provide a centralized system and method that not only maintains received documents on a secure server that is inaccessible to third-parties, but also automatically updates a chronological-based timeline of documents for efficient review by a system user.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2A is an orthogonal view of a document display panel associated with a case management system, depicting an image-and-text-based file format, in accordance with an embodiment of the present invention.

FIG. 2B is an orthogonal view of a document display panel associated with a case management system, depicting an image-based file format, in accordance with an embodiment of the present invention.

FIG. 2C is an orthogonal view of a document display panel associated with a case management system, depicting a text-based file format, in accordance with an embodiment of the present invention.

FIG. 3 is an orthogonal view of a file panel associated with a case management system that includes each document associated with the system, in accordance with an embodiment of the present invention.

FIG. 6 is an orthogonal view of a file and document searching panel associated with a case management system, in accordance with an embodiment of the present invention.

FIG. 7 is an orthogonal view of an interactive calendar view associated with a case management system, in accordance with an embodiment of the present invention.

FIG. 9 is an orthogonal view of a final report associated with a case management system that includes executable file links to documents within the case management system, in accordance with an embodiment of the present invention.

DETAILED DESCRIPTION OF THE INVENTION

Figure 1:
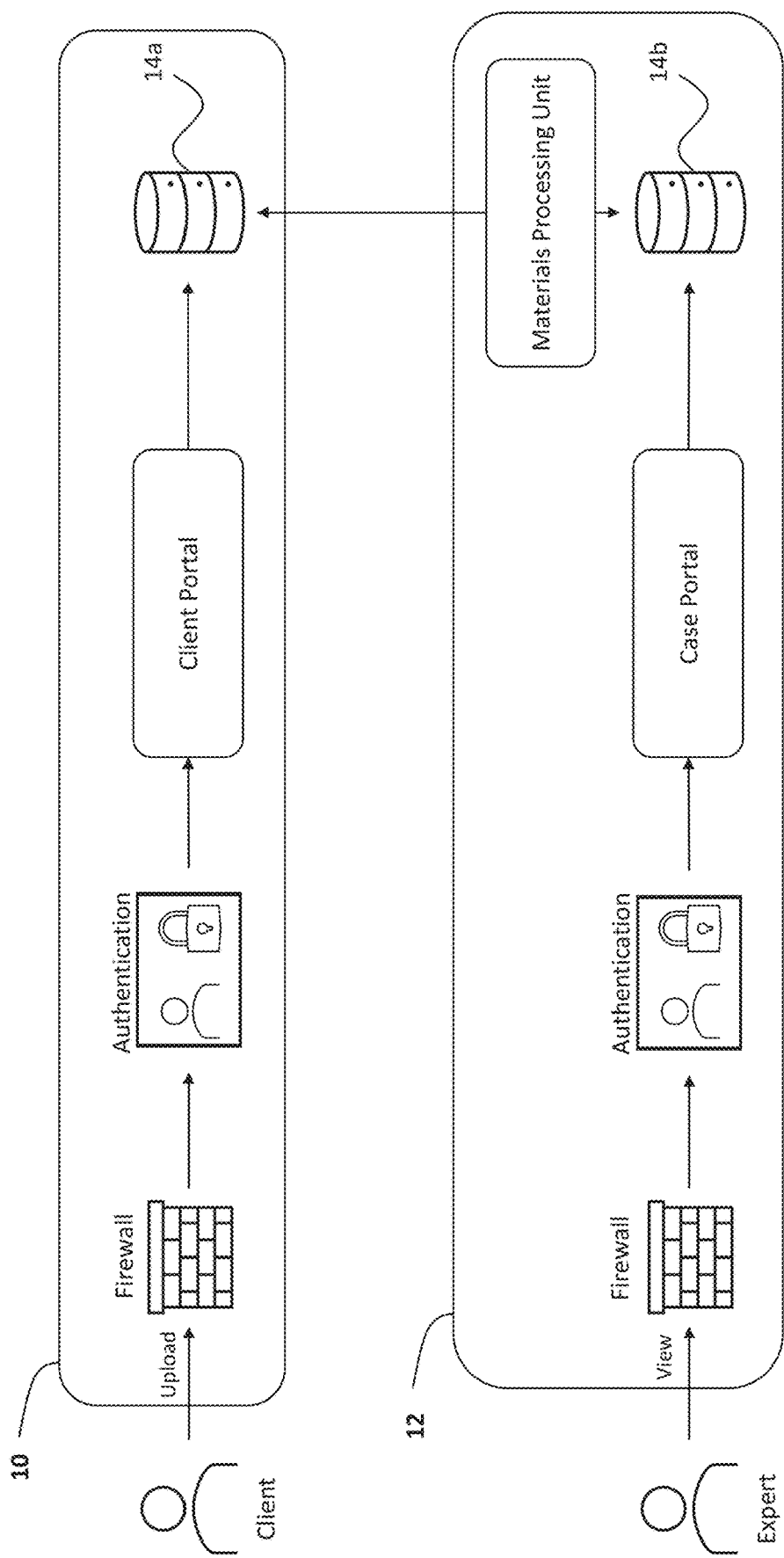
FIG. 1 is a process flow diagram depicting an overview of a secure document transfer from a temporary storage unit on a client side of a system to a permanent storage unit on a reviewing party side of the system, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a case management system and method of dynamically managing and organizing interactive documents within the case portfolio for efficient review, including data that is dynamically updated to result in a final report that includes real-time updated data. As data is uploaded via a local copy to a client portal server of the case management system by a third-party stakeholder, such as a medical or legal professional, a case management server associated with the case management system receives the uploaded data through a permanent copy. As such, the local upload copy of the data on the client portal server is inaccessible after the data transfer. However, the third-party stakeholder can access a read-only version of the data located on the case management server via an executable access link on the client portal server after the data transfers to the case management server—this read-only version of the data may be referred to as a "presentation mode" of the data.

The case management server collects and displays the data on a secure portal for interactivity with a professional stakeholder reviewing the data. Moreover, the case management server displays the data in different formats as the server automatically transforms an initial file into a standard text-and-image file, a text-only file, and an image-only file, thereby allowing the reviewing stakeholder to interact with the data in multiple ways. As the case management server translates the document into different viewable formats, the server automatically scans the data within the document for important information, such as dates, times, names, locations, and other important pieces of information. These pieces of information are displayed to the stakeholder as a suggested document tagging, or association, option during review.

In addition, the case management server assigns date-and-time associations with each document, and automatically organizes the documents in a chronological order on a display, such as a calendar display or a chronological chart display, such that a reviewing stakeholder can easily and efficiently view a timeline of events including links to documents associated with the chronological display. Moreover, based on received selections and based on the chronological order, the server compiles data from the documents on the chronological display into a final report, including summarized information from the documents generated or received by the server, as well as links to the documents themselves. The final report is capable of being transmitted to other stakeholders associated with the case management system, or capable of being displayed during an event such as a deposition, a hearing, a trial, or other event during which quick recollection of documents from a case management system is desired. The sections herein below describe the case management system and method in greater detail.

As shown in FIG. 1, an embodiment of the case management system includes a server 12 that is configured to receive data in the form of batches of documents each including a plurality of pieces of information that may or may not be useful during a review of a particular document. The server 12 receives the documents via a cloud-based upload portal 10, through which a first user (the disclosing party, alternatively referred to as the client) stores a copy of each document within a batch for transmission to the server 12, which is associated with a receiving party (alternatively referred to as the expert). In an example of the case management system, the disclosing party is a law firm that is engaged in an active lawsuit that requires an opinion by an expert witness, such as a medical professional reviewing medical records for a particular injury. In this example, the receiving party is the expert witness, who is tasked with reviewing a plurality of data points to form an opinion on the validity of a claim related to the injury.

To form the opinion, the expert witness must initially receive the documents typically produced during a discovery period of a litigation matter; as such, the server 12 receives copies of the documents for storage and review through the case management system user interface. However, such a document production process typically must remain confidential and requires security measures in place to protect the documents from inadvertent disclosure, either due to local or national laws (such as those associated with the Health Insurance Portability and Accountability Act, or HIPAA), or other ethical rules on disclosure of confidential materials (such as the American Bar Association Model Rules of Professional Conduct). Accordingly, during the transfer of documents from the disclosing party to the receiving party, the server 12 receives the copy of each document within the batch of documents via permanent storage unit 14b, such that the local copy of the documents is no longer present on the disclosing party's server (while ensuring that the original copy remains in the possession of the disclosing party). Prior to transmission to the server 12, the local copy of the documents on the cloud-based upload portal 10 is stored in temporary storage unit 14a. As such, the receiving party receives the copy of each document uploaded to the system, with the disclosing party being unable to independently access the documents without a unique, secure authentication to access a read-only version of the overall case management system.

As shown in FIGS. 2A-2C, once the server 12 receives an initial batch of documents, the server 12 stores each document in three different formats. First, the server 12 stores the document itself without transforming the data therein; often the initial storage format is a file that includes both image and text, such as a Portable Document Format (PDF) file, as shown in FIG. 2A. Since files that include both image and text tend to be larger files, the server 12 transforms the original document into a machine-readable format by scanning the document for recognizable text that is displayable as a text-only file for the reviewing party (i.e., a stakeholder associated with the receiving party, such as an expert witness), as shown in FIG. 2C. In addition, as shown in FIG. 2B, the server 12 transforms the data in a second way by displaying each document as an image that is storable as a smaller file size, such that the image files can be easily uploaded to a secondary location (such as a web browser) for quick access and review. Importantly, the smaller file size associated with the image file (an example of which is shown in FIG. 2B) is such that the file can receive additional data from the reviewing party, such as a tag (as will be described in greater detail below), without significantly increasing the file size. As such, the image file is easily editable and is configured to receive a data input from a user while maintaining a small file size that improves a processor speed associated with the case management system during review and presentation.

Moreover, any underlying data associated with the documents (such as metadata related to document creation and editing dates) is saved on the server 12 and associated with the documents during the upload and transformation processes. As the server 12 transforms the data from each document into different formats, the server 12 automatically compares the metadata from a newly added document with the remaining documents associated with the server 12 to discard any newly added document that includes metadata that matches the metadata of a prior document. As such, the server 12 automatically prevents an upload of a duplicate document with identical metadata associated therewith. In addition, during the data transformation, the server 12 provides an alert to discard any duplicate documents based on the compared scanned data from the documents. Upon receiving a selection from a user, the server 12 discards documents with duplicative scanned data thereon, thereby ensuring that only one copy of each document appears within the case management system.

Figure 3:
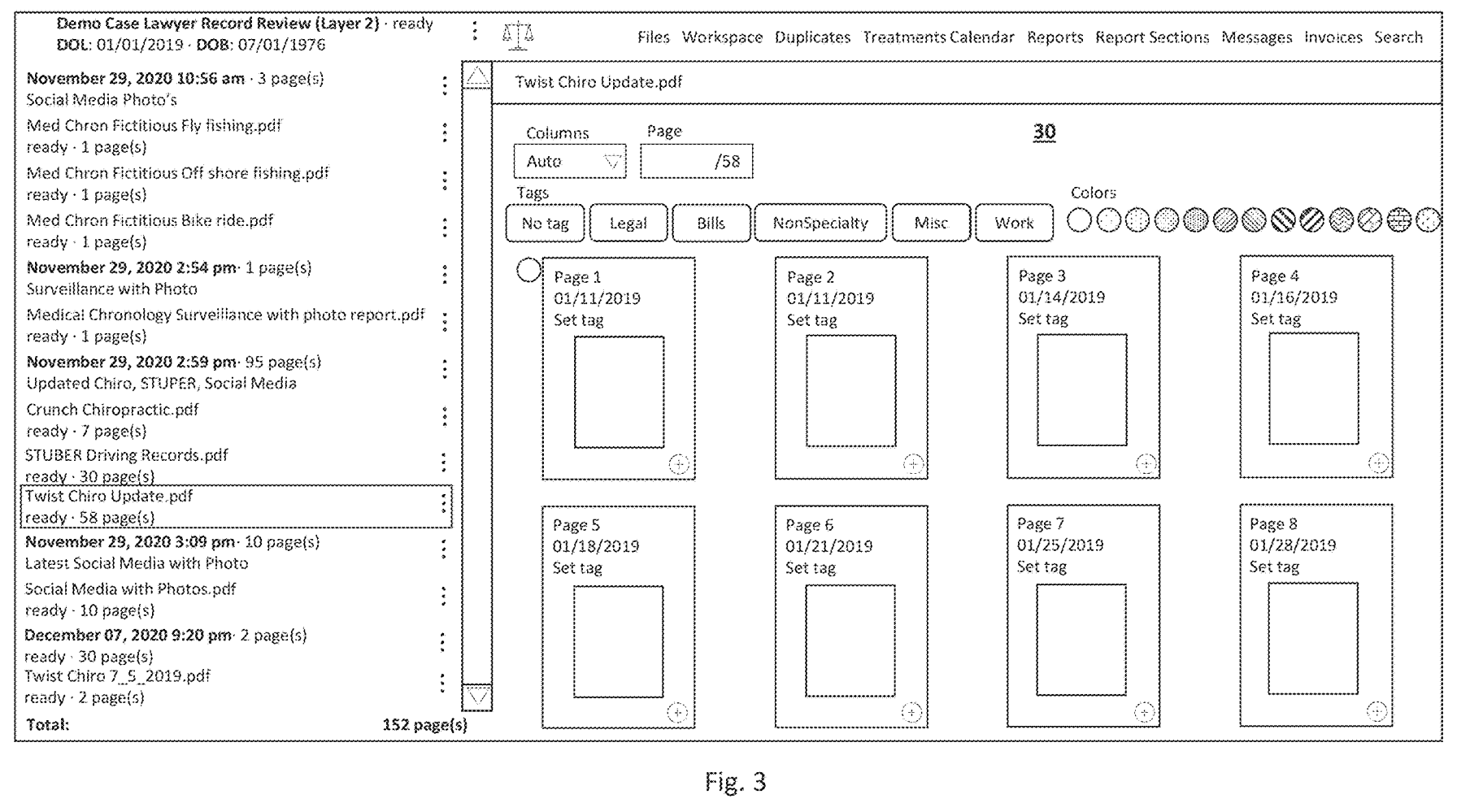
Figure 4:
FIG. 4 is an orthogonal view of a file comparison panel associated with a case management system, in accordance with an embodiment of the present invention.

As shown in FIG. 3, the total amount of documents for a particular file within the case management system, after being received on the server 12, are assembled for display on an overview page (which can be launched on a web browser) that may be referred to as a file panel 30. The file panel 30, including all the documents received by the server 12 for a file, provides a centralized location for a system user to initially view and interact with one or more documents from the file. In addition, the file panel 30 arranges and displays all the received documents and other files in an order of receipt by the server 12, such that a reviewing party not only views all the documents uploaded to the server in a centralized location, but also views the order of upload to the server 12 for all the documents and file. From the file panel 30, the server 12 can receive a request from a user to display a single document in the document review panel as shown in FIGS. 2A-2C, via which the user can interact with the chosen document (as will be described in greater detail below). In addition, the server 12 displays a preview of a document upon receiving a request from a user, such that the document appears as a pop-up on the display device in association with the server 12. Moreover, as shown in FIG. 4, one or more documents can be displayed through a comparison panel 40, which can be executed via the file panel or a workspace panel (described in greater detail below). The comparison panel 40 provides a display of multiple documents on a singular graphical user interface, such as report 42a and photograph 42b as shown in the embodiment of FIG. 4. As such, a reviewing party can quickly compare scanned information on a plurality of documents (such as report 42a and photograph 42b) in a simultaneous manner, thereby improving a review speed and improving a processing speed associated with the server 12, as fewer selections and executable files are required to compare documents on the comparison panel 40.

Figure 5:
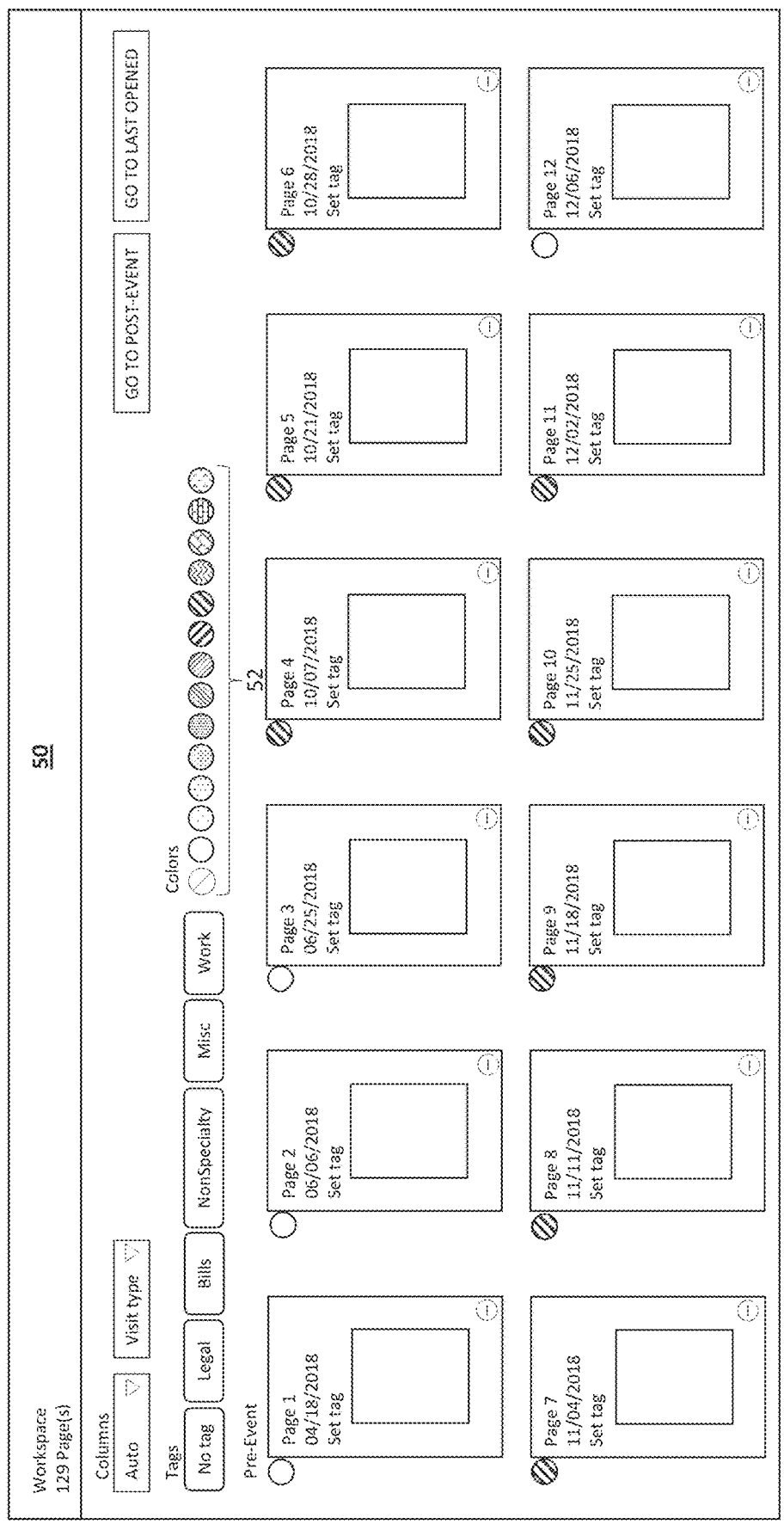
FIG. 5 is an orthogonal view of a workspace panel associated with a case management system that includes a portion of the documents associated with the system, in accordance with an embodiment of the present invention.

Moreover, in certain situations, it may be beneficial to organize documents within a single file into different workspaces depending on the particular needs of the system; for example, in a medical-based litigation case, workspaces can include physician opinions, reports from law enforcement personnel, and patient activities. As shown in FIG. 5, rather than viewing different documents within the file panel 30, the server 12 can receive an input to separate one or more of the documents into a particular workspace 50 for further review alongside similar documents. In addition, not all documents and files within a particular batch include data of importance to the reviewing party; as such, an absence of an input to a particular document ensures that the document remains only in the file panel 30, preventing the need for the reviewing party to further review the document. Accordingly, the server 12 can receive an instruction to tag a particular document with a workspace designator 52, thereby separating the chosen document from the remaining documents in the file panel 30 by adding the chosen document to a workspace 50. The server 12 can receive the input of the workspace designator 52 within the file panel 30 itself, such as by displaying a version of the document via a preview tab, or can receive the input from the document review panel (as shown in FIGS. 2A-2C, and described in greater detail below). In addition, multiple different workspaces 50 can exist within the server 12 through different workspace designators 52 to separate documents into different review spaces depending on the nature of the document and its importance in the review process.

As noted above, the server 12 transforms each original document into a machine-readable format by scanning the document for recognizable text; this machine-readable format is displayed within the workspace panel. During the process of scanning the document for recognizable text, the server 12 utilizes machine learning-based techniques to recognize predetermined pieces of information that would be of interest to the reviewing party. As an example, during a litigation matter, timelines of events are often critical to determining liability for a certain situation, such as an injury related to a car accident. While the car accident may cause a new injury or exacerbate an existing injury, it is important for each stakeholder in the litigation matter to obtain a full view of the medical condition of the injured party, both before and after the occurrence of the car accident. As such, understanding a timeline of events in a quick and efficient way is important for all parties to the litigation matter.

Accordingly, the server 12, while scanning the document for recognizable text, recognizes certain pieces of information as predetermined when initially setting up the case management system—since the system is modular, different forms and sub-forms can be used to build the final report based on information within the documents, depending on the needs of the reviewing party. For example, important documents within a case portfolio for a litigation matter include dates and times (to build a chronology); acting parties (such as an evaluating physician); document authorship; and locations (such as a medical office, which can be used to determine a reason for the creation of the document, such as a visit type or report type). Typically, documents must be manually reviewed during a lengthy process to determine when and where certain events took place; using the car accident example above, it is important to know not only when and where the accident took place, but also location and timing information for any medical visits by the injured party before and after the accident, as well as any activities undertaken by the injured party before and after the accident (such as physical activities, which are important to evaluating a particular injury).

As such, the server 12 scans each document immediately subsequent to or simultaneous with the data transformation to a readable text format. The server 12 then suggests or automatically fills the scanned information into a document tagging system, which is verified by the receiving party prior to finalizing a report based on the information. Accordingly, as opposed to the manual process of searching through documents for particular key pieces of information, such as dates, acting parties, authors, visit types, and locations, the server 12 automatically reads and displays the information to the reviewing party to reduce a reviewing time for each document.

Figure 6:
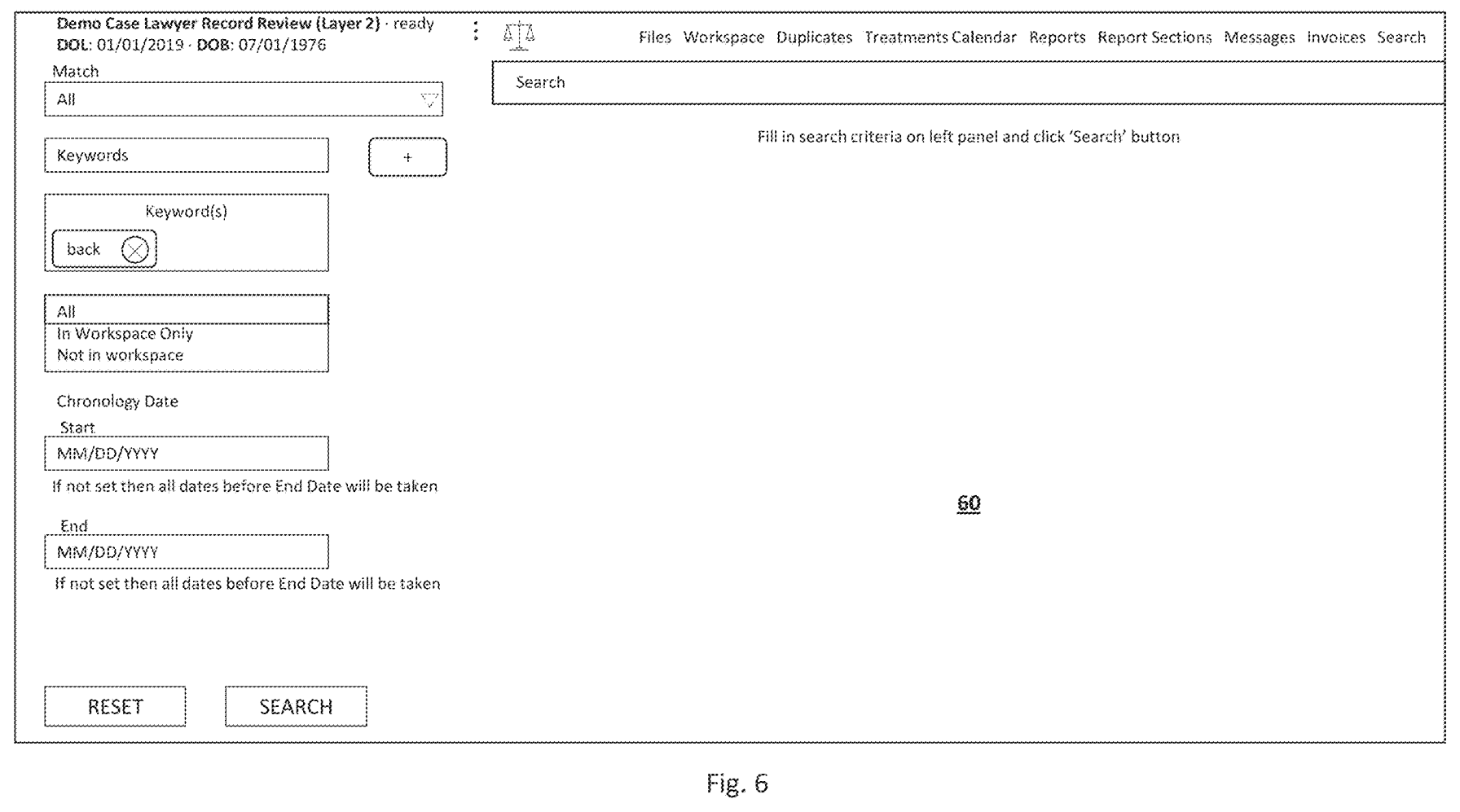

Moreover, once a selection of information is confirmed, either by the reviewing party or by the server 12, the tagged documents are assembled into a chronological and/or location-based format for an efficient review after tagging via one or more workspace designators 52. Additional tags can be associated with each document, either automatically through system-based text scanning based on preconfigured identifying data, or by receiving an input from a receiving party; for example, a particular document could be labelled as "unimportant" by receiving an underlying and/or visual indicator, such as a colored tag. A different document could be labelled as "medical visit" by receiving a different underlying and/or visual indicator, such as a different colored tag. Each tag applied to a particular document creates another subset of documents that are viewable by a reviewer and capable of being compiled into a final report. In addition, each tag applied to a particular document organizes the document into one or more workspaces 50, as described in greater detail above. Moreover, as shown in FIG. 6, the server 12 provides a search and filtration feature 60 that searches through documents within the file panel 30 or one or more workspaces 50 for a keyword (such as an acting party, a location, a date, or another term associated with a document).

An example of the tagging and selection system is shown in FIGS. 2A-2C. As shown in FIGS. 2A-2C, an embodiment of the system includes a document review panel 20 that is designed to display one or more documents that have been transformed by the server 12. The different file formats are displayed for a selection by a user to view the document in various formats—a PDF version, an image-based version, and a text-based version. Moreover, within the document review panel 20 for each file format, the system is designed to receive a selection from a user to highlight, categorize, or otherwise tag one or more pieces of information within the document displayed on the document review panel 20. The result of this highlight function is referred to as reference numeral 22. In an embodiment, the image-based version is configured to receive the selection from the user due to the small file size associated with the image-based version, thereby improving a processor speed associated with the server 12. In addition, as noted above, an embodiment of the server 12 scans through each document to display a suggested date and time 24 to be associated with the document. The server 12 displays the suggested date and time 24 adjacent to the document within the document review panel 20 to receive a selection from a reviewing party.

Similarly, additional information can be associated with a particular document via a manual input, such as an additional date associated with a document. For example, a document may include a record of multiple visits to medical facilities; while the system reads the dates associated with each visit, the system can also receive a manual input of a confirmation of each important date, such that the document is associated with each date within the document. As such, the system can display the document in association with various dates on a calendar or chart view, described in further detail below. Moreover, the system can receive an input from a user to highlight a particular set of data within a document for display upon a subsequent viewing of the document.

Throughout the process of uploading, reviewing, and tagging documents via the server 12, many different parties can participate in the process and maintain access to the documents and the chronology. Whereas with physical documents or a system with a single authenticated login, only a single party can interact with information at a given time, the case management system provides secure access for multiple parties associated with the receiving party (such as different reviewing parties and assistants). In addition, the server 12 is capable of creating and sharing a unique login link to provide secure access to the case management system to a third-party who is associated with the case, such as a law firm or other professional who is authorized to interact with the case management system. As such, information related to the case management system can be viewed in real time by a particular stakeholder, such that each party to a particular matter can be aware of decisions made throughout the document review process before a final report is generated. Moreover, the server provides a real-time communication feature between users of the system 12, such that the users can communicate via a text and/or audio-based communications platform, including chat notifications and email notifications.

In addition, throughout the process of reviewing documents and data within a case management system, typically more than one batch of information is received for review, either via a server or by a physical document delivery. Each subsequent document release results in a restarting of the document review process, forcing the reviewing party to integrate the new documents with the old documents in a manageable way that does not duplicate previous work performed on the documents. While some systems are capable of filtering out duplicate documents from subsequent batches, typically, a manual merge-and-sort process must be implemented to create a single data set from a plurality of batches of data.

Accordingly, the case management system includes a real-time data merging functionality, such that each document, upon upload, is automatically merged into the existing set of documents the moment the document is uploaded to the system. In addition, as noted above, the server 12 automatically transforms the data from each document into different formats, such that a text-based format is used to determine data such as dates, times, locations, stakeholders, and other key pieces of information from each document. As such, as the real-time merge of documents occurs, the system identifies unique, important pieces of information from each new document in the same way that the system scans the initial document set. For the reviewing party, the documents are viewable within the merged set of documents for the verification and building of the chronology of documents without duplicating work.

Figure 7:
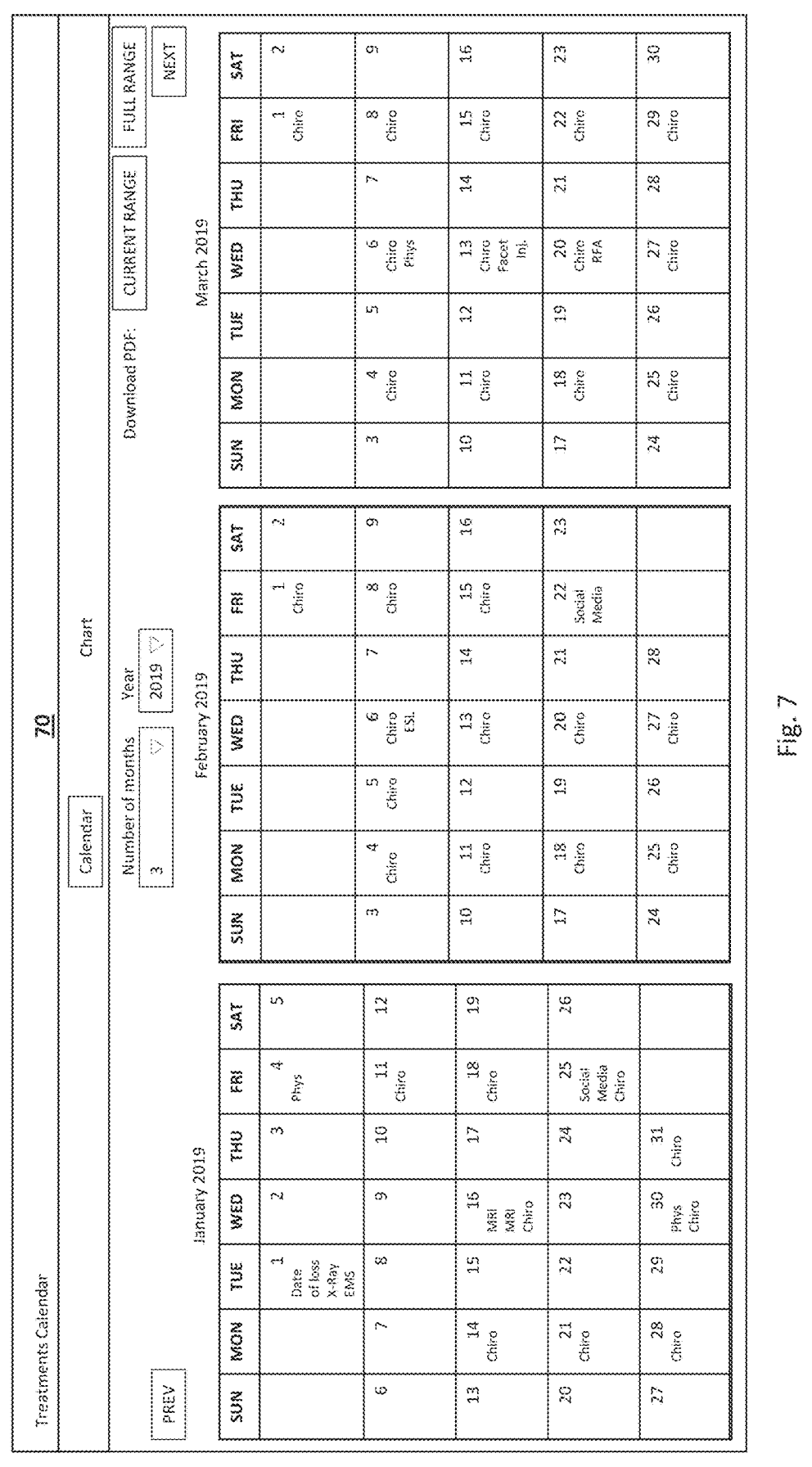
Figure 8:
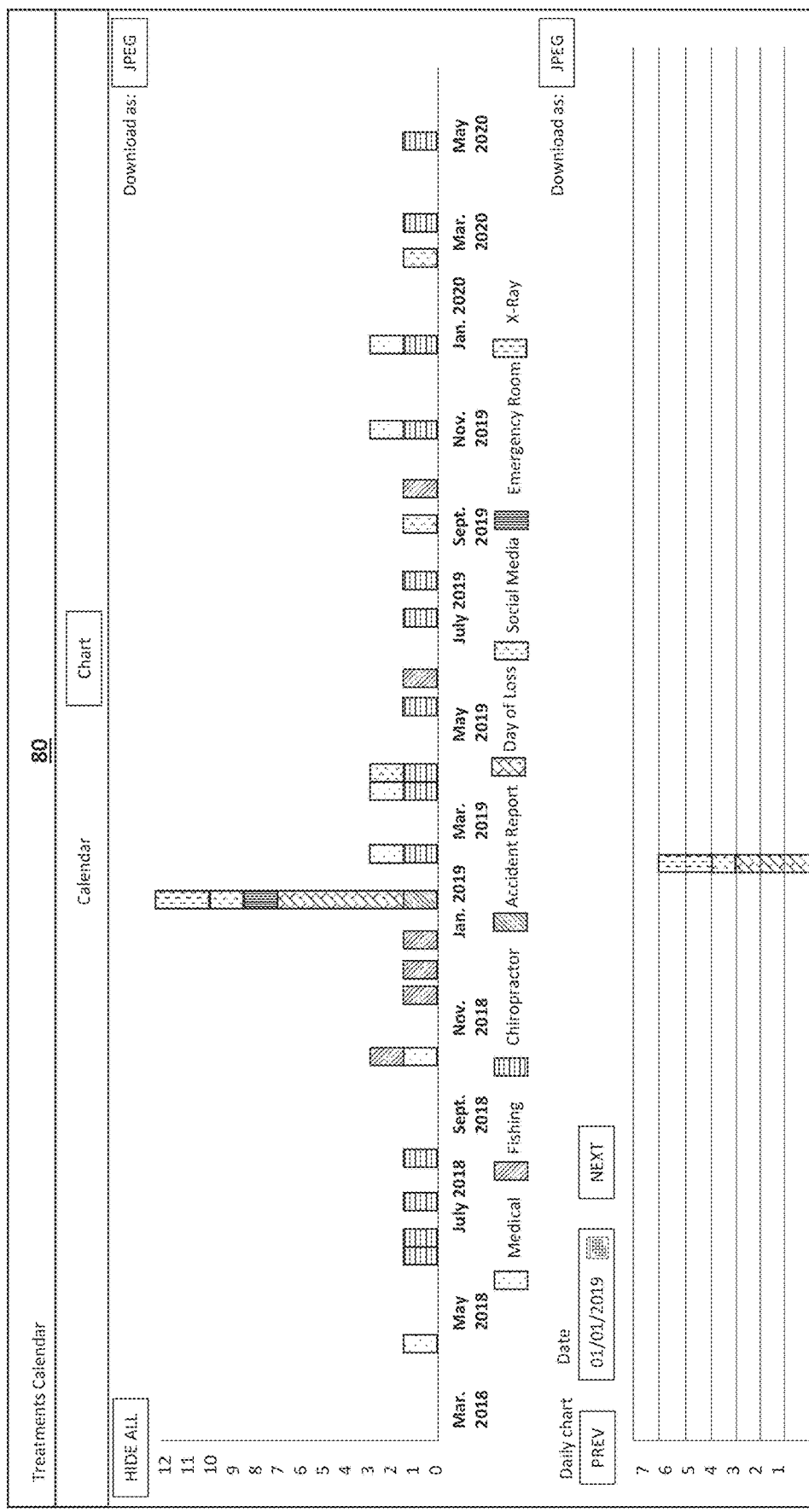
FIG. 8 is an orthogonal view of an interactive chart-based view associated with a case management system, in accordance with an embodiment of the present invention.

As documents are reviewed and, particularly, as dates are confirmed to be associated with the documents within a particular subset of the case management system, the system organizes and displays documents within an interactive calendar view 70 (an embodiment of which is shown in FIG. 7) and/or a chart-based view 80 (an embodiment of which is shown in FIG. 8). The calendar view 70 provides a visual method of viewing days, weeks, months, and years with identifiers appearing on the calendar to provide feedback on the presence of a relevant document that is associated with a particular date. As such, a reviewing party can easily visualize a timeline of events based on a calendar view 70. Moreover, the calendar view 70 is interactive by the server 12 providing an executable file link for each document displayed in the calendar view 70, such that the server 12 can launch one or more documents for review on the document review panel 20.

In addition, the chart-based view 80 provides a similar functionality—viewing chronological documents that are relevant to a particular inquiry—but displays the documents on a singular timeline. As opposed to relying on a traditional calendar, the chart-based view 80 provides a timeline that is easily viewable to not only see when certain events occurred (such as a traumatic event, a medical visit, etc.), but also any gaps in time between the occurrence of events. Similarly, the chart-based view 80 is interactive by the server 12 providing an executable file link for each document displayed in the chart-based view 80, such that the server 12 can launch one or more documents for review on the document review panel 20.

The calendar view 70 and the chart-based view 80 can display all the relevant documents from the case management system, or can be organized by workspaces, depending on the tagging information received by the server 12. Moreover, the calendar view 70 and the chart-based view 80 are each interactive and customizable, such that the server 12 displays one or more documents based on a selection from the calendar view 70 or the chart-based view 80, and such that certain documents can be filtered out by the server 12 without being displayed on the calendar 70 or the chart 80.

As noted above, the case management system is configured to generate a final report based on data from within the documents storable on the server 12. The final report is configurable based on the needs of the particular project associated with the case management system; for example, a law firm employing the case management system may configure the final report to include data related to a defense or a claim of a litigation matter, such as factors related to a legal standard for proving or disproving a particular cause of action. In another example, an expert witness employing the case management system may configure the final report to include data related to an opinion on the merits of a particular cause of action or defense to a cause of action.

To that end, as shown in FIG. 9, the system provides for the configuration of one or more final reports 90 that receive data from a user input, scannable data from the documents, or other data capture methods known within the art. As such, upon configuration by an administrator, the modular and configurable case management system can assemble a final report 90 including one or more pieces of information across the documents within the case management system, depending on the requirements of the system, which can utilize the data tags discussed in greater detail above. Moreover, the fields of data used within the system are infinitely customizable by the administrator, depending on the requirements of the final report 90.

In addition to the chronologically-displayed data discussed in the sections above, the case management system presents the data in the final report 90 in such a way that each individual document referenced in the final report 90 is displayable via an executable file link disposed within the final report 90 when viewed electronically (the plurality of executable file links are referred to as reference numeral 92). As such, a reviewing party can not only review all documents within a particular batch of documents or document tag on a case chronology-based calendar display, but also the reviewing party can view documents individually as needed from the final report 90. This feature of the system renders an interactive final report 90, such that the reviewing party can review the underlying data associated with the final report 90 that is derived from the analysis of the case portfolio via the case management system.

Accordingly, by utilizing the system, the various stakeholders related to a case portfolio can interact with documents within the case portfolio via the secure case management system. New documents seamlessly merge into the document set through the case management system for review and assortment into a final report and/or chronological view. Moreover, the system provides a secure platform for the management of a case portfolio and all related documents as the server 12 receives the uploaded copy of each document without providing access to the documents outside of the server 12 without proper authentication, such as through a unique and secure login page. The final report provides an infinitely customizable interactive document including pieces of information specified by an administrator upon setup, with the information selected for display within the final report being automatically read by the system or selected by a user. By providing a case management system that automatically transforms received data into a plurality of different formats, including searchable text and a smaller image file, the case management system provides reviewing parties with a highly efficient method of classifying, organizing, and reviewing specific documents within a portfolio.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of managing and organizing files within a case portfolio, the method comprising the steps of:

receiving, via a server in communication with a database, an initial plurality of files, each of the initial plurality of files including an amount of data thereon, such that each of the initial plurality of files is stored on the database in communication with the server;

automatically transforming, via the server, each of the initial plurality of files into a machine-readable text format and a separate image-based format by scanning, via the server, each of the initial plurality of files for recognizable text, and displaying, via the server, the recognizable text from each of the initial plurality of files;

after transforming each of the initial plurality of files into the machine-readable text format, automatically displaying, via the server, a suggested date associated with each of the initial plurality of files based on the recognizable text;

receiving, via the image-based format, for at least one of the initial plurality of files, a confirmation to associate the suggested date with a selected at least one of the initial plurality of files;

organizing, via the server, the initial plurality of files in a chronological order based on the suggested date; and displaying, via the server, the initial plurality of files in the chronological order, such that the server provides a link between the displayed initial plurality of files in the chronological order and each document of the initial plurality of files, such that the server is configured to receive an instruction, via the displayed initial plurality of files in the chronological order, to display at least one of the initial plurality of files.

2. The method of claim 1, further comprising the step of receiving, for at least one of the initial plurality of files, an identification tag based on a category of the least one of the initial plurality of files.

3. The method of claim 2, further comprising the step of organizing, via the server, the initial plurality of files by the identification tag.

4. The method of claim 1, further comprising the step of receiving, via the server, a second plurality of files, each of the second plurality of files including an amount of data thereon, such that each of the second plurality of files is stored on the database in communication with the server.

5. The method of claim 4, further comprising the step of automatically transforming, via the server, each of the second plurality of files into a machine-readable text format and a separate image-based format by scanning, via the server, each of the second plurality of files for recognizable text, and displaying, via the server, the recognizable text from each of the second plurality of files.

6. The method of claim 5, further comprising the step of automatically displaying, via the server, a suggested date associated with each of the second plurality of files.

7. The method of claim 6, further comprising the steps of automatically integrating each of the second plurality of files with each of the initial plurality of files, and organizing, via the server, the second plurality of files in the chronological order based on the suggested date.

8. The method of claim 1, further comprising the step of displaying, via the server, the initial plurality of files in the chronological order on a timeline display including a start date and an end date arranged along an axis, such that each date between the start date and the end date is viewable in the timeline display.

9. The method of claim 8, further comprising the step of receiving an instruction to display at least one of the initial plurality of files via a selection on the timeline display.

10. The method of claim 1, further comprising the step of displaying, via the server, the initial plurality of files in the chronological order on a calendar display, wherein the initial plurality of files are displayed on days and months displayed on the calendar display.

11. The method of claim 10, further comprising the step of receiving an instruction to display at least one of the initial plurality of files via a selection on the calendar display.

12. The method of claim 1, further comprising the step of generating, via the server, a final report including a selected group of the initial plurality of files, the final report including an executable file link for each of the selected group of the initial plurality of files.

13. The method of claim 12, further comprising the step of receiving an instruction to display at least one of the selected group of the initial plurality of files via a selection of the executable file link for the at least one of the selected group of the initial plurality of files.

14. A case management system for managing and organizing files within a case portfolio, the case management system comprising:
a processor; and
a non-transitory computer-readable medium operably coupled to the processor, the computer-readable medium having computer-readable instructions stored thereon that, when executed by the processor, cause a case management system to manage and organize files within a case portfolio by executing instructions comprising:
receiving, via the non-transitory computer-readable medium operably coupled to the processor, an initial plurality of files, each of the initial plurality of files including an amount of data thereon, such that each of the initial plurality of files is stored on the non-transitory computer-readable medium operably coupled to the processor;
automatically transforming, via the non-transitory computer-readable medium operably coupled to the processor, each of the initial plurality of files into a machine-readable text format and a separate image-based format by scanning, via the non-transitory computer-readable medium operably coupled to the processor, each of the initial plurality of files for recognizable text, and displaying, via the non-transitory computer-readable medium operably coupled to the processor, the recognizable text from each of the initial plurality of files;
after transforming each of the initial plurality of files into the machine-readable text format, automatically displaying, via the non-transitory computer-readable medium operably coupled to the processor, a suggested date associated with each of the initial plurality of files;
receiving, via the image-based format, for at least one of the initial plurality of files, a confirmation to associate the suggested date with a selected at least one of the initial plurality of files;
organizing, via the non-transitory computer-readable medium operably coupled to the processor, the initial plurality of files in a chronological order based on the suggested date; and
displaying, via the non-transitory computer-readable medium operably coupled to the processor, the initial plurality of files in the chronological order, such that the non-transitory computer-readable medium operably coupled to the processor provides a link between the displayed initial plurality of files in the chronological order and each document of the initial plurality of files, such that the non-transitory computer-readable medium operably coupled to the processor is configured to receive an instruction, via the displayed initial plurality of files in the chronological order, to display at least one of the initial plurality of files.

15. The case management system of claim 14, wherein the executed instructions further comprise receiving, via the non-transitory computer-readable medium operably coupled to the processor, a second plurality of files, each of the second plurality of files including an amount of data thereon, such that each of the second plurality of files is stored on the non-transitory computer-readable medium operably coupled to the processor.

16. The case management system of claim 15, wherein the executed instructions further comprise automatically transforming, via the non-transitory computer-readable medium operably coupled to the processor, each of the second plurality of files into a machine-readable text format and a separate image-based format by scanning, via the non-transitory computer-readable medium operably coupled to the processor, each of the second plurality of files for recognizable text, and displaying, via the non-transitory computer-readable medium operably coupled to the processor, the recognizable text from each of the second plurality of files.

17. The method of claim 16, wherein the executed instructions further comprise automatically displaying, via the non-transitory computer-readable medium operably coupled to the processor, a suggested date associated with each of the second plurality of files.

18. The method of claim 17, wherein the executed instructions further comprise automatically integrating each of the second plurality of files with each of the initial plurality of files, and organizing, via the non-transitory computer-readable medium operably coupled to the processor, the second plurality of files in the chronological order based on the suggested date.

19. The method of claim 14, wherein the executed instructions further comprise generating, via the non-transitory computer-readable medium operably coupled to the processor, a final report including a selected group of the initial plurality of files, the final report including an executable file link for each of the selected group of the initial plurality of files.

20. The method of claim 19, wherein the executed instructions further comprise receiving an instruction to display at least one of the selected group of the initial plurality of files via a selection of the executable file link for the at least one of the selected group of the initial plurality of files.

* * * * *